United States Patent [19]

Lubowitz

[11] 3,803,081
[45] *Apr. 9, 1974

[54] POLYAMIDE MOLDING POWDER PREPOLYMERS AND METHOD OF PREPARATION

[75] Inventor: Hyman R. Lubowitz, Hawthorne, Calif.

[73] Assignee: TRW Inc., Redondo Beach, Calif.

[ * ] Notice: The portion of the term of this patent subsequent to Sept. 15, 1987, has been disclaimed.

[22] Filed: June 12, 1972

[21] Appl. No.: 262,931

Related U.S. Application Data

[63] Continuation-in-part of Ser. No. 650,625, July 3, 1967, Pat. No. 3,528,950, and a continuation-in-part of Ser. No. 31,979, April 27, 1970, abandoned.

[52] U.S. Cl. ............. 260/37 N, 260/47 CP, 260/65, 260/78 TF, 260/78 UA, 260/78.4 R, 260/857 PI

[51] Int. Cl. ............................................ C08g 20/32
[58] Field of Search. 260/47 CP, 65, 78 TF, 78.4 R, 260/78 UA, 857 PI

[56] References Cited
UNITED STATES PATENTS

| | | | |
|---|---|---|---|
| 3,708,459 | 1/1973 | Lubowitz | 260/65 |
| 3,528,950 | 9/1970 | Lubowitz | 260/78.4 |
| 3,699,074 | 10/1972 | Lubowitz et al. | 260/37 |

*Primary Examiner*—Lester L. Lee
*Attorney, Agent, or Firm*—Alan D. Akers; Willie Krawitz; Daniel T. Anderson

[57] ABSTRACT

The invention described herein was made in the performance of work under a NASA Contract and the subject of the provisions of Section 305 of the National Aeronautics and Space Act of 1958, Public Law 85-568 (72 Statute 432; 42 USC 2457).

21 Claims, No Drawings

POLYAMIDE MOLDING POWDER PREPOLYMERS AND METHOD OF PREPARATION

This application is a continuation-in-part of copending application Ser. No. 650,625, filed on July 3, 1967, now U.S. Pat. No. 3,528,950, and Ser. No. 31,979, filed on Apr. 27, 1970, now abandoned.

This invention relates to a polymerizate consisting essentially of at least one polyamide-acid prepolymer and/or a polyimide prepolymer having average molecular weights ranging from 500 to 6,000. These prepolymers are obtained by reacting approximately stoichiometric amounts of at least one polyfunctional amine, polyfunctional anhydrides, and specific monoanhydrides at temperatures ranging from about 0° to 200° C. These prepolymers either alone or in combination with other materials, e.g., fillers, etc., may be pyrolytically cured at temperatures ranging from about 150° to 350° C to obtain thermally stable, high-molecular weight polymide resins. In addition, the polymerizate of prepolymers may be utilized for preparing various materials, e.g., molding powders or laminates, of improved thermal stability by pyrolytically polymerizing said prepolymers to the cured product.

BACKGROUND OF THE INVENTION

The polyimides are known to have outstanding physical and chemical properties, which makes them attractive for many applications, the problems encountered in processing and in preparing these polyimides have limited their full potential use. Generally, for example, the polyimides are obtained by synthesizing high-molecular weight or long-chain precursor polymers. These precursors are converted to the desired heterocyclic ring by completely imidizing or condensing them to the high-molecular weight polyimides. However, because these polyimides are almost impervious to solvents, they are now being marketed as a varnish, e.g., coatings for glass fabrics, etc., in the precursor form. The precursor, e.g., polyamide-acids, obtained by linear chain extension or polymerization is substantially unstable at ambient temperatures and therefore must be kept in solution hermetically sealed and refrigerated to avoid hydrolytic and oxidative degradation. Ultimately, the polyamide-acid precursors are cured by the application of heat for periods ranging up to about 16 hours at substantially elevated temperatures to produce the completely imidized product. This reaction is accompanied by the evolution of an appreciable amount of volatile matter, e.g., solvent, water, etc.

In comparison, the prepolymers of this invention avoid the use of high-molecular weight polyamide-acids and the long processing time associated therewith and thereby lessen considerably the disadvantages normally encountered with these polyimides. More specifically, the polymerizate containing the prepolymers of this invention, i.e., the polyimide prepolymers, are stable at ambient temperatures and the resins obtained therefrom have outstanding physical and chemical properties. The thermo-oxidative stability is particularly outstanding for those polyimides prepared from amines and anhydrides which contain aromatic rings. Thus, because of the attractive properties of the polyimide resins and the precursors thereof, i.e., polyamide-acid and polyimide prepolymers, the cured resins of this invention have found numerous applications in fields of advanced technology where high-strength and high-temperature plastics are needed.

SUMMARY OF THE INVENTION

This invention is directed to a polymerizate containing one or more prepolymers and to a method of preparing said polymerizate. More specifically, this invention is directed to a polymerizate consisting essentially of polyamide-acid prepolymers and polyimide prepolymers and to the use of said prepolymers in preparing thermally stable, high-molecular weight polyimide resins having an average molecular weight of at least 10,000. Still further, this invention relates to the use of polyimide prepolymers and polyamide-acid prepolymers in the preparation of reinforced laminates characterized as having a low void content and being thermally stable at high temperatures. In addition, these prepolymers may be used either alone or in combination with fillers for preparing molding powders having particles with surface areas ranging from about 1 to 800 square meters per gram.

The polymerizates containing the prepolymers are obtained by coreacting approximately stoichiometric amounts of at least one polyfunctional amine, polyfunctional anhydrides, and a particular monoanhydride having the formula:

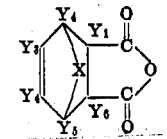

wherein $Y_1 - Y_6$, inclusive, can be hydrogen, halogen, nitro, aryl, alkyl having 1 to 6 carbon atoms, alkyl ether having 1 to 6 carbon atoms, or alkaryl and X can be carbonyl, oxygen, sulfur, methylene, halogen, substituted methylene, alkyl substituted methylene, or aryl substituted methylene. The prepolymers, i.e., polyamide-acids and polyimide prepolymers are converted pyrolytically to high-molecular weight polyimide resins which are useful particularly in areas where high strength and temperature materials are required. Presently, polyimides are being marketed as varnishes, coatings for glass fabrics, insulating enamels, self-supporting films, laminating resins, bearings, piston rings, etc., where the resin must function at temperatures and under conditions where most other known polymeric materials have failed.

DESCRIPTION OF THE PREFERRED EMBODIMENTS

Rapid-cure, stable polyimides having high temperature stability and improved mechanical properties can be obtained from relatively low-molecular weight polyamide acid and/or polyimide prepolymers which are chain terminated with specific monoanhydrides characterized as being reactive at elevated temperatures. More specifically, it has been found that polymerizates comprising polyamide-acid and/or polyimide prepolymers having an average molecular weight ranging from about 500 to 6,000 can be obtained by reacting at temperatures ranging up to about 200° C, approximately stoichiometric amounts, i.e., calculated stoichiometric equivalents of at least one polyfunctional amine, e.g., an aromatic diamine, one or more polyfunctional anhydrides, e.g., an aromatic dianhydride and monoanhydride having the formula:

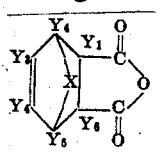

wherein $Y_1 - Y_6$, inclusive, can be hydrogen, halogen, nitro, aryl, alkyl having 1 to 6 carbon atoms, alkyl ether having 1 to 6 carbon atoms, or alkaryl and X can be carbonyl, oxygen, sulfur, methylene, halogen substituted methylene, alkyl substituted methylene, or aryl substituted methylene. These compounds are made by Diels-Alder reactions, e.g., furane reacted with maleic anhydride at room temperature will produce oxy nadic anhydride.

The polymerizate consists essentially of at least one prepolymer selected from the group consisting of polyamide-acid prepolymers having the general formula: I.

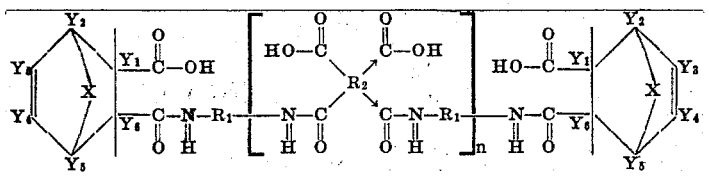

polyimide prepolymers having the general formula: II.

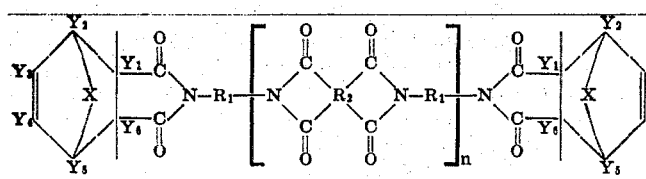

and mixtures of said prepolymers in any proportion, i.e., up to 100 percent by weight. In the above formula, the arrows denote isomerism where in any recurring unit the groups to which arrows point may exist as shown or in interchanged positions; n has a value ranging from 1 to 20 and preferably from 1 to 15; $Y_1$ through $Y_6$, and X have been previously identified; $R_1$ is a difunctional radical selected from the group consisting of an alkylene radical, an arylene radical, an alkarylene radical, a cycloalkylene radical, a heterocyclic aromatic radical, an aralkylene radical, an arylene sulfoxide radical, an arylene sulfone radical, an arylene sulfide radical, an arylene ether radical, an arylene alkoxy radical, and an alkalkylene radical; and $R_2$ is a tetravalent organic radical derived from aliphatic, cycloaliphatic, carbocyclic, aromatic or heterocyclic groups such that four carbonyl groups are attached directly to separate carbon atoms and each pair of carbonyl groups being attached to adjacent carbon atoms. More preferably, $R_2$ is a tetravalent radical containing at least one ring of 6 carbon atoms, said rings characterized by benzenoid unsaturation, the four carbonyl groups being attached directly to separate carbon atoms in a ring of the $R_2$ radical, and each pair of carbonyl groups being attached to adjacent carbon atoms in a ring of the $R_2$ radical.

More particularly, the prepolymer polymerizates of this invention consist essentially of a polyamide-acid prepolymer, a polyimide prepolymer, or mixtures thereof. Thus, in preparing the polymerizate, depending upon the reaction temperatures, i.e., temperatures ranging from 0° to 200° C, the polymerizate may consist essentially of a polyamide-acid prepolymer, a polyimide prepolymer, or a mixture of these prepolymers wherein the polyamide-acid is present in said mixture in an amount ranging up to 100 percent and the polyimide prepolymer constituting the remainder, and preferably the polyamide-acid prepolymer ranging from about 2 to 98 percent by weight with the polyimide prepolymer making up the remainder. The prepolymers, i.e., the polyimide prepolymer and/or polyamide-acid prepolymer of the polymerizate are comparatively low molecular weight procursors which have average molecular weights ranging from about 500 to 6,000 and preferably have from 500 to 3,000 depending upon the particular polyfunctional amines and polyfunctional anhydrides and the reaction conditions employed. It is to be understood that the above formulas ideally identifying a polyimide and a polyamide-acid have been depicted separately to more clearly illustrate the respective structures. In reality, the separate structures do not exist but rather comprise a prepolymer chain containing both structures in a statistical distribution corresponding to the percents by weight disclosed for each structure.

Thus, in preparing the polymerizate of prepolymers, the polyfunctional amines, polyfunctional anhydrides and monoanhydrides are coreacted or condensed at temperatures ranging from about 0° to 200° C and preferably at temperatures ranging from about 30° to 200° C. Depending upon the temperatures of the reaction, the ratio between the polyamide-acid prepolymer and polyimide prepolymer will vary up to 100 percent with respect to one another. For example, in preparing a polymerizate consisting essentially of a polyamide-acid prepolymer, the reaction may be carried out at temperatures ranging from about 0° to 125° C and preferably at temperatures ranging from about 0° to −50° C. On the other hand, polymerizates consisting essentially of a polyimide prepolymer is obtained by carrying out the reaction at temperatures ranging from about 125° to 200° C. These prepolymers are readily converted by pyrolytic polymerization, i.e., at temperatures of at least 200° C or ranging from about 200° to 350° C to a completely imidized polyimide resin having an average molecular weight of at least 10,000.

While it is not completely understood, it is believed that the prepolymers, i.e., the precursors of the polyimide resin having a particular monoanhydride, e.g., 3,6-endomethylene-1,2,3,6-tetrahydrophthalic anhydride in the molecular terminal position when heated to temperatures about about 200° C become reactive and pyrolytically polymerize to provide di- and terpolymer molecular linkages producing three dimensional macromolecules of higher molecular weight.

Accordingly, since polymerization is by a pyrolytic reaction of the monoanhydride, it is obvious that this kind of polymerization, which is essentially an addition-type of reaction, takes place without the release of a substantial amount of voltatile matter. Thus, it is possible to produce products, e.g., molding powders or laminates having a low void content since said products are obtained from low molecular weight prepolymers which are pyrolytically converted to completely cured polyimide resins. The absence of volatile matter, e.g., water and solvent, produce products which are substantially void-free, i.e., less than 2 percent by volume, and therefore have increased mechanical strengths at high temperatures.

In preparing the prepolymers of this invention, the polyfunctional amines, e.g., aromatic amines containing at least one benzene ring, polyfunctional anhydrides, e.g., aromatic anhydrides containing at least one benzene ring, and monoanhydrides may be coreacted in any order in the presence of one or more organic solvents. Preferably, however, the prepolymers are obtained by first reacting the polyfunctional amine with the monoanhydride and then with the polyfunctional anhydride in a solvent, e.g., dimethyl formamide. While it is not necessary, it is preferred to react the polyfunctional amine with the monoanhydride and the polyfunctional anhydride in that particular order. These reactants are utilized in approximately stoichiometric proportions, i.e., the equivalence of amine are calculated to equal substantially the equivalence of the total anhydride content. However, an excess, e.g., up to about 5.0 percent, of either the amine or the anhydride may be used beyond the stoichiometric requirements depending upon the reactants and the ultimate use of the product. More specifically, the polyfunctional amines may be coreacted with a mixture of the polyfunctional anhydrides and monoanhydrides wherein the monoanhydrides range from about 1 to 60 percent, and preferably from 5 to 40 percent by weight of the anhydride mixture. As an alternative, the reactants may be thoroughly mixed as dry powders and the subsequently added to a solvent, e.g., dimethyl formamide. It has been found that by utilizing thoroughly mixed powders of the reactants, it is possible to substantially reduce the processing time while not appreciably affecting the properties of the final products. It should be noted, however, that the relative proportions of the reactants may vary with their respective molecular weights and the molecular weight desired of the prepolymers being prepared.

In preparing the prepolymer polymerizates of this invention, various polyfunctional amines, including the diamines and triamines may be used either alone or in combination in any relative proportion, e.g., from 0 to 100 percent by weight. However, the preferred polyfunctional amines include the diamines, e.g., aromatic amines containing at least one benzene ring and preferably two benzene rings. The aliphatic amines may have 5 to 22 carbon atoms per molecule as illustrated below:

2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1-10-dimethyl decane
1,12-diamino-octadecane
para-phenylene diamine
meta-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis(beta-amino-t-butyl)toluene
bis-(para-beta-amino-t-butyl-phenyl)ether
bis-(para-beta-methyl-delta-amino-pentyl)benzene
bis-para-(1,1-dimethyl-5-amino-pentyl)benzene
1-isopropyl-2,4-metaphenylene diamine
m-xylylene diamine
hexamethylene diamine
heptamethylene diamine
octoamethylene diamine
nonamethylene diamine
decamethylene diamine
diamino-propyl tetramethylene diamine
3-methylheptamethylene diamine
4,4'-dimethylheptamethylene diamine
2,11-diamino-dodecane
1,2-bis-(3-amino-propoxy)-ethane
2,2-dimethyl propylene diamine
3-methoxy-hexamethylene diamine
3,3'-dimethyl benzidine etc. and triamines such as
1,3,5-triaminobenzene
2,4,6-triamino-s-triazine
1,2,3-triaminopropane
4,4'4''-triaminotriphenyl methane
4,4',4''-triaminotriphenylcarbinol, etc.

The polyfunctional anhydrides which may be employed in preparing the prepolymer polmerizates of this invention are preferably dianhydrides, although trianhydrides may be used. The polyfunctional anhydrides which are particularly preferred, e.g., aromatic anhydrides containing at least one benzene ring, are included below and merely represent a number of anhydrides which may be used either alone or in combination in any proportion, e.g., ranging from 0 to 100 percent by weight. The anhydrides include:

pyromellitic dianhydride
benezophenone tetracarboxylic dianhydride
2,3,6,7-naphthalene tetracarboxylic dianhydride
3,3',4,4'-diphenyl tetracarboxylic dianhydride
1,3,5,6-naphthalene tetracarboxylic dianhydride
2,2',3,3'-diphenyl tetracarboxylic dianhydride
2,2-bis(3,4-dicarboxyphenyl)propane dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis (2,3-dicarboxyphenyl) ethane dianhydride 1,1-bis(3,4-dicarboxyphenyl) ethane dianhydride
bis(2,3-dicarboxyphenyl) methane dianhydride
bis(3,4-dicarboxyphenyl) methane dianhydride
bis(3,4-dicarboxyphenyl) sulfone dianhydride
benzene-1,2,3,4-tetracarboxylic dianhydride
1,2,3,4-butane tetracarboxylic dianhydride
thiophene-2,3,4,5-tetracarboxylic dianhydride, etc.

The organic solvents which may be utilized in preparing the prepolymer polymerizates include various organic liquids whose functional groups do not react with the prepolymers. Normally, organic solvents comprising the N,N-dialkylcarboxylamines are useful. The preferred solvents, however, are the lower molecular weight materials including N,N-dimethylformamide, N,N-dimethylacetamide, N,N-dimethylformamide, N,N-diethylacetamide, etc. In addition, solvents which may be used include the dimethylsulfoxides, N-methyl-2-pyrrolidone, pyridine, formamide, N-methylformamide, butyrolactone, etc. These solvents may be used either alone or in combination with other organic liquids, including, for example, benzene, dioxane, butyrolactone, toluene, xylene, cyclohexane, and various mixtures thereof in any proportion.

The prepolymers, i.e., polyimide prepolymers, polyamide-acid prepolymers and mixtures thereof, e.g., in amounts up to 100 percent by weight, may be utilized in neat form, i.e., without fillers, or in combination with any of the well known fillers including, for example, the fibers and powders of carbon, metal, boron, silicates, asbestos, synthetic materials, metal oxides, and particularly glass and carbon fibers as more specifically disclosed in U.S. Pat. Nos. 3,053,775 and 3,011,981. Fillers and various combinations thereof, particularly silica, may be used in preparing the molded articles and laminate structures utilizing the prepolymers, i.e., polyimide and polyamide-acid of this invention. The fillers may range from 0 to 85 percent and preferably from 10 to 60 percent by weight of the total composition.

The following are specific embodiments illustrating methods of preparing the polymerizate containing the polyimide and polyamide-acid prepolymers and their uses in accordance with this invention.

EXAMPLE I

Approximately 40.7 parts by weight of 4,4'-methylenedianiline, 32.8 parts by weight of 3,6-endomethylene-1,2,3,6-tetrahydrophthalic anhydride, and 33.9 parts by weight of 3,3',4,4'-benzophenone tetracarboxylic acid dianhydride were dissolves in 170 ml dimethylformamide and 400 ml toluene. The solution was refluxed for 18 hours during which time water was collected by means of the Dean Stark receiver. At the end of the refluxing period, the solution was cooled to room temperature and filtered. A precipitate or insoluble fraction was collected and dried overnight at 110° C under vacuum. The filtrate was slowly poured into three liters of rapidly stirring water, and stirring was continued overnight. During the stirring, a second precipitate formed and was collected by filtration and dried overnight at 110° C under vacuum. The first and second dried precipitates were separately ground into a fine powder. Yields for the first and second precipitates were 32.9 parts by weight and 60.9 parts by weight, respectively. The light yellow second fraction was determined to melt between 158° to 180° C. One part by weight of the second fraction and one part by weight of the first fraction were mechanically mixed and placed in a 50 ml beaker. The beaker containing the powder was placed in an oven at 350° C for 30 minutes and then cooled to room temperature. The resulting polymer was brown foam. Thermogravimetric analysis showed the polymer to be stabled to 400° C under nitrogen and had a char residue of 58.9 percent at 800° C. The char residue was glossy black and maintained the original shape of the sample with slightly less mechanical strength.

EXAMPLE II

A Pyrex reaction vessel fitted with a stainless steel water cooling coil and stirring apparatus was charged with a solution of 3,296 parts by weight of methylene dianiline in 4,200 ml of dimethylformamide. The solution in the reaction vessel was cooled to less than 30° C and maintained at less than 30° C throughout subsequent additions.

A cooled solution (less than 30° C) of 2,043 parts by weight 3,6-endomethylene-1,2,3,6-tetrahydrophalic anhydride in 2338 ml dimethylformamide was slowly added to the reaction vessel. A slurry of 3350 parts by weight 3,3',4,4'-benzopheneone tetracarboxylic acid dianhydride in 2,675 ml of dimethylformamide was slowly added to the reaction vessel. An additional 4,675 ml dimethylformamide was added to the reaction vessel to dilute the solution (varnish) to the desired 40 percent solids loading. The varnish solution was stirred for one hour to ensure that all reactions have gone to completion to give a completely soluble polyamide-acid solution.

These varnishes have the following properties:
1. Specific gravity 1.092–1.096 at 23° ± 2° C.
2. Viscosity 200–300 centipoises at 25° C
3. Acid number 3.5–4.0
4. Gel time (length of time required for varnish to "set up" when dropped on the surface of a hot plate at 600° F) 30–50 sec.

EXAMPLE III

A 500 ml quantity of varnish prepared in Example II was placed in a one-liter round-bottomed flask and the flask was attached to a vacuum rotary evaporator. An oil bath was used to heat the contents of the flask to 150° over a 45 minute period. The contents were removed from the flask and finely ground. The ground material was placed in a forced air oven at 125° C until the volatile matter content, measured by subjecting samples of the powder to 600° F for 30 minutes and measuring the weight loss, reached 5.0 percent. The brown powder was then ready for molding. These powders may be dried to retain from about 0 to 10 percent by weight of solvent in the powder. They may be subsequently further dried to a solvent content of 0 to 2.0 by weight prior to molding.

EXAMPLE IV

Neat molded plugs (1-inch diameter × ¼-inch thick) were made by charging a mold preheated to the desired temperature with five grams of the powder prepared in Example III. Various conditions employed to make neat molded plugs are listed below:

| Sample | Dwell Time, Min. | Applied Pressure | Mold Temp., °F. | Time, Min. |
|---|---|---|---|---|
| 1 | 3 | 500 | 550 | 30 |
| 2 | 5½ | 1000 | 550 | 30 |
| 3 | 5 | 500 | 600 | 30 |
| 4 | 5 | 1000 | 600 | 30 |
| 5 | 5 | 1500 | 600 | 30 |

Barcol hardness for the cured samples were 46, 47, 46, 47 and 48, respectively. All samples cured as above were brown in color. The samples were aged in air (100 cc/min) at 600° F. Weight loss was as follows:

| Sample | 100 hours | 500 hours | 800 hours |
|---|---|---|---|
| 1 | 5.5% | 26% | 48% |
| 2 | 3.0% | 12% | 24% |
| 3 | 3.0% | 14% | 32% |
| 4 | 3.5% | 14% | 23% |
| 5 | 3.0% | 8% | 15% |

The cured plugs undergo no physical changes upon standing at room temperature.

EXAMPLE V

About 39.84 parts by weight of methylene dianiline was dissolved in 65 parts by weight of dimethylformamide with heating. 41.90 parts by weight of 4,4'-diaminodiphenyl sulfide were dissolved in 65 parts by weight of dimethylformamide and then combined with methylene dianiline solution. The amine solution was cooled below 30° C and maintained at about 30° C throughout the addition of the anhydride solutions. A methyl Nadic anhydride solution was prepared by dissolving 54.83 parts by weight of 4-methyl-3,6-endomethylene-1,2,3,6-tetrahydrophthalic anhydride in 50 parts by weight of dimethylformamide. This solution was slowly added to the mixed amine solution with stirring. A solution, prepared by dissolving 77.59 parts by weight of 3,4',4,4'-benzophenone tetracarboxylic acid dianhydride in 160 ml of dimethylformamide with heating, was slowly added to the mixed amine-methyl Nadic anhydride solution and the entire solution or varnish was stirred for 30 minutes. The brown varnish has a viscosity of 363 centipoise at 26° C.

EXAMPLE VI

The varnish prepared in Example V was placed in a one liter round-bottomed flask and the flask was attached to a vacuum rotary evaporator. An oil bath was used to heat the contents of the flask to 155° C over a 35-minute period. The contents were removed and dried in a forced air oven at 140° C until a voltatile matter content of 1.8 percent was reached.

EXAMPLE VII

Powder prepared in Example VI was molded under the following conditions to produce tensile bars:

| | |
|---|---|
| Tensile bar mold temperature | 575°F |
| Powder charge | 3.5 gms |
| Dwell | 60 sec |
| Molding pressure | 2000 |
| Cure time | 1 hour |

Specimens molded in the above manner were found to have the following physical properties:

| | |
|---|---|
| Specific gravity: | 1.31 |
| Stress: | 8250 psi |
| Modulus: | 4.65 ×10$^5$ psi |
| Elongation: | 2.23% |

Samples were shown to have excellent thermal and oxidative stability when tested in air (100 cc/min) at 600° F.

EXAMPLE VIII

A solution was prepared by dissolving 85.84 parts by weight of methylene dianiline in 160 parts by weight of dimethylformamide with heating. This solution was cooled to below 30° C and maintained at less than 30° C throughout the entire varnish preparation. 60.54 parts by weight of Nadic anhydride, i.e., 3,6-endomethylene-1,2,3,6-tetrahydrophthalic anhydride were dissolved in 40 parts by weight of dimethylformamide with heating and added to the amine solution with stirring. 53.88 parts by weight of pyromellitic dianhydride was dissolved in 118 parts by weight of dimethylformamide with heating. This solution was added to the amine-Nadic anhydride solution. The varnish solution was stirred about 45 minutes. The physical characteristics of the varnish (solution) were:

Viscosity: 92 Cps at 23° C

Specific gravity: 1.080 at 23° C

The varnish was stored at room temperature.

EXAMPLE IX

The varnish prepared in Example VIII was placed in a one-liter round-bottomed flask and the flask attached to a vacuum rotary evaporator. The varnish was heated to 140° C for a one-hour period with the aid of an oil bath. The material was removed from the flask and dried in a forced air oven at 140° C until a volatile matter content of 4.4 percent was attained. At this time, the material was ball milled to a fine powder.

EXAMPLE X

Neat molded plugs were prepared from the powder made in Example IX. A preheated mold at 630° F was charged with 5 grams of powder and a dwell time of three minutes was allowed. The sample was cured under 1,000 psi for 30 minutes. Samples prepared in the above manner were dark in color and had a Barcol hardness from 41 to 44.

EXAMPLE XI

The following ingredients were ground and mixed together to form a uniform powder:

| | Parts by Weight |
|---|---|
| Methylene dianiline | 227.6 |
| Nadic anhydride (3,6-endomethylene-1,2,3,6-tetrahydrophthalic monoanhydride) | 141.0 |
| Benzophenone tetracarboxylic acid dianhydride | 231.2 |

The above powder was slowly added to 996 ml dimethylformamide at a temperature of about 30° C. After all the powder had been added, the solution was stirred one hour. The varnish prepared in the above manner had the following properties:

| | |
|---|---|
| Acid number | 3.81 |

| Viscosity | 390 Cps at 24°C |
| Specific gravity | 1.095 at 24°C |

EXAMPLE XII

The varnish of Example XI was processed to a powder form by spray drying using a Bowen Engineering conical laboratory spray dryer. In the spray drying operation, the varnish fed at approximately 100 ml/min was atomized by a centrifugal wheel system and contacted with air heated to 600° F by an electric heater. The air, approximately 250 CFM, was pulled through the drying chamber by a centrifugal blower. A cyclone collector was used to remove the powder from the hot air stream. The volatile matter content of the light brown powder processed in the above manner ranged from 7 to 10 percent.

The prepolymers may be converted by various means, e.g., ball milling, etc., to molding powders having particles with surface areas ranging from about 1 to 800 square meters per gram and preferably from 50 to 600 square meters per gram. The surface area may be measured by absorption of nitrogen from a gas stream of nitrogen and helium at liquid nitrogen temperature, using the technique described by F. M. Nelson and F. T. Eggersten (Analytical Chemistry 30, 1387 (1958)).

The prepolymer polymerizates prepared in accordance with this invention may be utilized for preparing thermally stable, low-void laminates by impregnating a fibrous material, e.g., glass fibers, with a solution or dispersion of said polymerizate of prepolymers in an amount whereby said prepolymers are present in the glass fibers in amounts ranging up to about 80 percent by weight, e.g., 1.0 – 50 percent. The impregnated fibers are subsequently heated under pressures ranging up to 5,000 psi and preferably ranging from 50 to 1,200 psi at temperatures ranging from about 200° to 350° C until a cured laminate is obtained. The resin flow of fibrous reinforcing materials can be controlled by utilizing prepolymers which naturally contain an appreciable amount, e.g., 2 to 8 percent by weight of an organic solvent. The resin flow of various prepolymer-impregnated fibrous material was determined by the standard test procedures by applying pressures of about 200 psi at a temperature of about 600° F of six plies of 4 inch square prepreg cut on a 45° bias.

The molding compound was prepared with a 325 mesh silica flour and a one-fourth inch chopped glass fiber which were predried for about two hours at 250° F in an air-circulating oven. After cooling in a desiccator, they were dry blended with various voltatile content powders by tumbling in a ball mill. The powder, even though ground and sieved, had a large portion of particles only slightly smaller than 200 mesh.

Preparation of the pyrolytically cured, cross-linked polyimides of this invention is accomplished by curing polyamide-acid and/or polyimide prepolymers of comparatively low molecular weight at temperatures ranging from about 200° to 350° C. The cured cross-linked polyimides may be characterized as three dimensional, pyrolytically polymerized polyimide macromolecules having outstanding thermal and mechanical properties which may be obtained from the prepolymers over relatively short periods of time. Although the specific mechanisms by which the improved polyimide resins are obtained are not completely known, it is believed that the end-capping or monoanhydride group on the prepolymer molecular chain becomes reactive at temperatures around 200° C and thereby produces chemical species which undergo addition-type di- and terpolymerization forming macromolecules having molecular weights of at least 10,000. The chemistry associated with the preparation of the prepolymers capped with the appropriate monoanhydrides can be best understood by referring to the following equations wherein R, $R_1$ and $R_2$ and n are as previously described.

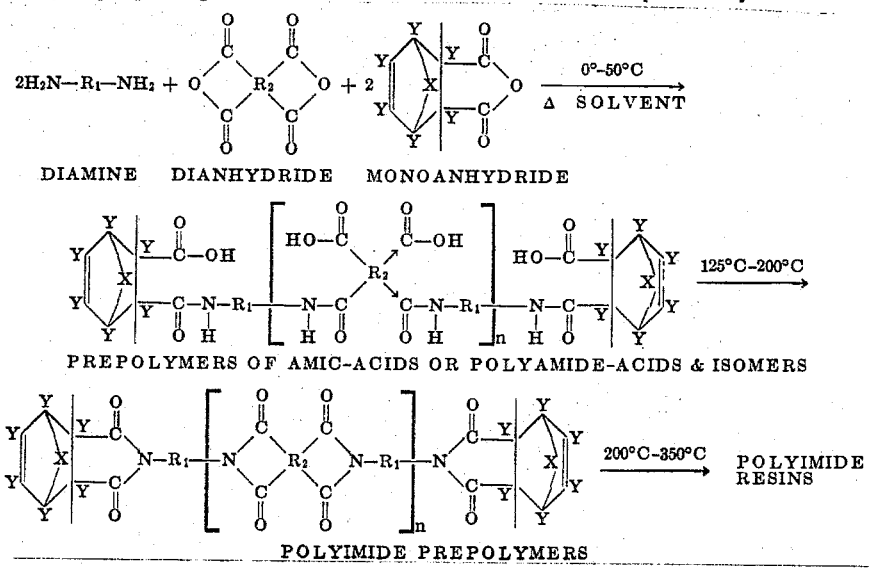

Although current technology suggests the preparation of polyamide-acid prepolymers as a varnish in an appropriate solvent, e.g., dimethylformamide for certain applications, it is desirable in many cases to prepare fully formed polyimides as a solution or dispersion. The technique required involves dissolving the ingredients in a solvent, i.e., dimethylformamide, followed by refluxing said ingredients for periods ranging up to 18 hours. At the end of this reflux period, a product is precipitated from the solution which may be characterized as a fully-imidized polyimide prepolymer of comparatively low molecular weight.

This solid material may be isolated from the solvent by filtration or by any other means whereupon the mother liquor from the filtration is either evaporated in a vacuum or used directly as a slurry in combination with the imide prepolymer to form a paste. Further, the product mother liquor may be completely removed, dried and then subsequently mixed with the original imidized prepolymer thereby giving a combination of polyamide-acid prepolymer and polyimide prepolymer. The polyamide-acid isolated from the solvent can be imidized by drying and then mixed with the original solid imide product. Any combination of these prepolymers may be used for preparing molding products either at atmospheric pressure or with applied pressure at temperatures ranging from 200° to 350° C. These methods yield pyrolytically polymerized polyimide thermosetting resins possessing excellent thermo-oxidative stability and mechanical integrity. For certain reinforced products, it may be desirable to coat the polyamide-acid prepolymer, as prepared in the solvent, on a substrate followed by staging and curing. However, for forming molded articles, it may be desirable to employ polyamide-acid prepolymer powders, polyimide prepolymer powders or mixtures of said prepolymers, i.e., 2 to 98 percent for pyrolytic polymerization cure whereby unfilled articles can be obtained. If desirable, large amounts of filler or reinforcing material, e.g., silica etc., may be added to the molding powders or laminating compositions depending upon the ultimate use of the product. Various inorganic and organic fillers may be used in combination with the prepolymers in amounts ranging from 0 to 85 percent and more preferably in amounts from 10 to 60 percent by weight. These fillers include inorganic materials such as, for example, silica, carbon, graphite, glass fibers, boron, metal oxides, clays, and various mixtures of these and any other of the known fillers in any proportion.

The polyamide-acid and polyimide prepolymers when subjected to pressures ranging up to about 5,000 psi display excellent flow characteristics at temperatures above 450° F. During the flow process the prepolymers cure to a dense resinous product, whether in the neat or reinforced form, having a low void content. The reasons for the low void content of these products is due primarily to the novelty and nature of the pyrolytic cure involving the di- or terpolymerization. In addition to the high flow characteristics and low void content, the products of this invention possess high thermo-oxidative stability as well as high mechanical integrity at temperatures up to about 750° F.

While this invention has been described with respect to a number of specific embodiments, it is obvious that there are other variations and modifications which can be made without departing from the spirit and scope of the invention as particularly pointed out in the appended claims.

I claim:

1. A prepolymer polymerizate mixture consisting essentially of up to 100 percent by weight of at least one polyamide-acid prepolymer having the general formula:

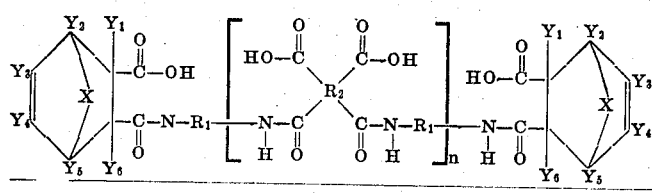

and the remainder a polyimide prepolymer having the general formula

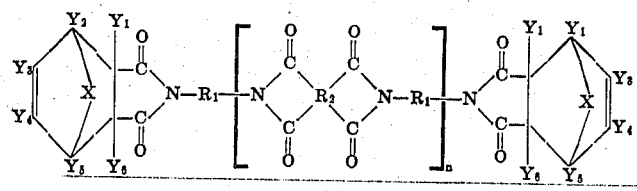

wherein n has a value ranging from 1 to 15; wherein $Y_1$ through $Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; $R_1$ is a difunctional radical selected from the group consisting of an arylene radical, an alkylene radical, a cycloalkylene radical, an aralkylene radical, an alkarylene radical, an arylene sulfone radical, an arylene sulfide radical, an arylene ether radical, an arylene alkoxy radical, an alkalkylene radical, and a heterocyclic aromatic radical; and $R_2$ is a tetravalent organic radical which is an aliphatic, cycloaliphatic, carbocyclic aromatic or heterocyclic groups such that 4 carbonyl groups are attached directly to separate carbon atoms and each pair of carbonyl groups being attached to adjacent carbon atoms.

2. A polymerizate of prepolymers consisting essentially of 2 to 98 percent by weight of at least one polyamide-acid prepolymer having the general formula:

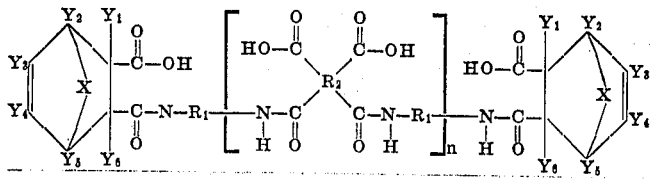

and 98 to 2 percent by weight of at least one polyimide prepolymer having the general formula:

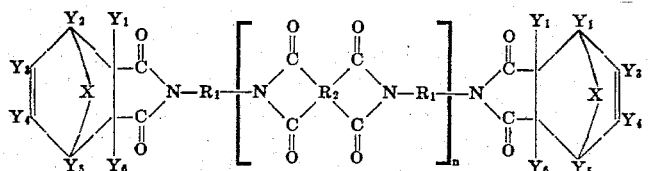

wherein n has a value ranging from 1 to 15; wherein $Y_1$ through $Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; $R_1$ is a di-functional radical selected from the group consisting of an arylene radical, an alkylene radical, a cycloalkylene radical, an aralkylene radical, an alkarylene radical, an arylene sulfone radical, an arylene sulfide radical, an arylene ether radical, an arylene alkoxy radical, an alkalkylene radical, and a heterocyclic aromatic radical; and $R_2$ is a tetravalent organic radical which is an aliphatic, cycloaliphatic, carbocyclic aromatic or heterocyclic groups such that four carbonyl groups are attached directly to separate carbon atoms and each pair of carbonyl groups being attached to adjacent carbon atoms.

3. The polymerizate of claim 1 further characterized as consisting essentially of a mixture of the polyamide-acid prepolymers and the polyimide prepolymers wherein said polyimide prepolymers are present in the mixture in an amount ranging from about 2 – 98 percent by weight.

4. A polyimide resin having an average molecular weight of at least 10,000 obtained by heating the polymerizate of claim 1 to a temperature above 200° C.

5. The polymerizate of claim 1 further characterized in that $R_1$ and $R_2$ are the same radical.

6. The polymerizate of claim 1 further characterized in that $R_1$ is different from $R_2$ and is an arylene radical of an amine containing at least one benzene ring.

7. The polymerizate of claim 1 further characterized in that $R_2$ is different from $R_1$ and is an arylene radical of a dianhydride containing at least one benzene ring.

8. The polymerizate of claim 1 further characterized in that $R_1$ is the arylene radical of 4,4'-methylenedianiline and $R_2$ is the tetravalent aromatic radical of 3,3',4,4'-benzophenone tetracarboxylic-acid dianhydride.

9. The polymerizate of claim 8 further characterized in that R is hydrogen.

10. Molding powders having particles with surface areas ranging from about 1 to 800 square meters per gram, said powders comprising the polymerizate of prepolymers of claim 2.

11. The molding powders of claim 10 further characterized as comprising 0 to 85 percent by weight of a filler.

12. The molding powders of claim 11 further characterized as having particles with surface areas ranging from about 50 to 600 square meters per gram and comprising 10 to 60 percent by weight of an inorganic filler.

13. Molding powders of claim 10 further characterized as comprising a mixture of a polyamide-acid prepolymer and a polyimide prepolymer wherein the polyamide-acid prepolymer is present in said mixture in an amount ranging from about 10 to 60 percent by weight.

14. A process for preparing molding powders containing 10 to 90 percent by weight of polyamide-acid prepolymers and 10 to 90 percent by weight of polyimide prepolymers which comprises reacting in an organic solvent at a temperature ranging from about 0° to about 200° C approximately stoichiometric amounts of at least one primary diamine, a dianhydride, and a monoanhydride to obtain a polymerizate of prepolymers having an average molecular weight ranging from about 500 to 6,000; removing substantially all of the solvent by drying from said polymerizate and subsequently reducing the prepolymers to particles having surface areas ranging from about 1 to 800 square meters per gram; said monoanhydride having the formula:

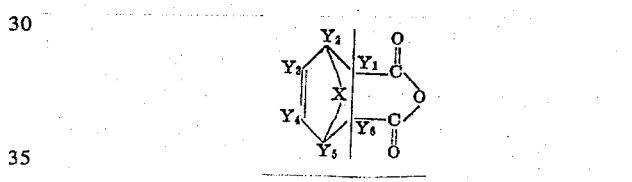

wherein $Y_1$ through $Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene.

15. The process of claim 14 further characterized in that the polymerizate of prepolymers have an average molecular weight ranging from about 500 to 3,000 and particles with surface areas ranging from about 50 to 600 square meters per gram.

16. The process of claim 14 further characterized in that about 0 to 10 percent by weight of the solvent remains in the prepolymers.

17. The process of claim 14 further characterized in that the temperature ranges from about 30° to 200° C.

18. The process of claim 14 further characterized in that the polymerizate of prepolymers comprises 10 to 60 percent by weight of polyamide-acid prepolymers.

19. The process of claim 14 further characterized in that R is hydrogen.

20. The process of claim 14 further characterized in that R is a methyl radical.

21. The process of claim 14 further characterized in that the dianhydride is an aromatic dianhydride and the diamine is an aromatic diamine.

* * * * *